March 3, 1970  W. KOHLHAAS ET AL  3,498,720
CONCAVE GRATING ULTRAVIOLET VACUUM SPECTROMETER
Filed Nov. 17, 1967  2 Sheets-Sheet 1

INVENTORS
Wilhelm Kohlhaas &
Johannes Conrads
BY Spencer & Kaye
ATTORNEYS

INVENTORS
Wilhelm Kohlhaas &
Johannes Conrads
BY Spencer & Kaye
ATTORNEYS

# United States Patent Office 3,498,720
Patented Mar. 3, 1970

3,498,720
CONCAVE GRATING ULTRAVIOLET VACUUM SPECTROMETER
Wilhelm Kohlhaas, Julich, Germany, and Johannes Conrads, Hampton, Va., assignors to Kernforschungsanlage Julich G.m.b.H., Julich, Germany
Filed Nov. 17, 1967, Ser. No. 685,242
Claims priority, application Germany, Nov. 17, 1966, K 60,731
Int. Cl. G01n 21/34
U.S. Cl. 356—51        7 Claims

ABSTRACT OF THE DISCLOSURE

Spectrometer apparatus for permitting a complete spectral analysis of radiation from a stationary source to be effectuated in a simple manner, the apparatus including an entrance slit, a concave reflection grating and at least one detector, all arranged along a Rowland circle, a pivot bearing to which the grating and detector are connected for movement along the Rowland circle, and a support element supporting the pivot bearing and arranged for rotation about the longitudinal axis of the entrance slit, the slit axis being normal to the plane containing the Rowland circle and being spaced from the axis of the pivot bearing by a distance equal to the radius of the Rowland circle.

BACKGROUND OF THE INVENTION

The present invention relates to a vacuum spectrometer intended particularly for the diffraction of light in the short wavelength portion of the ultraviolet spectrum. For this part of the spectrum, spectrographic measurements are made in a vacuum in order to eliminate absorption by the air.

One widely used type of spectrometer arrangement employs a concave reflection grating in conjunction with an entrance slit and some type of detector for the light dispersed by the grating. The grating itself is generally ruled on a concave mirror and is made by spacing straight grooves equally along the chord of a spherical or paraboloidal mirror surface. This type of grating can both collimate and focus the light that falls upon it. Light which passes through the slit and which falls on such grating is dispersed by it into spectra which are in focus on the Rowland circle, a circle drawn tangent to the face of the grating and its midpoint and having a diameter equal to the radius of curvature of the grating surface.

In arrangements of this type, the center of the entrance slit, the center of the concave grating and the center of the concave recording film or detector, or, in those cases where a polychromatic detection is employed, the center(s) of the exit slit(s), of the spectrometer arrangement are all disposed on the Rowland circle. In this arrangement a line normal to the plane tangent to the grating surface at the center of the grating and passing through the center of the grating extends toward the center of the Rowland circle, as does a line passing through the median plane of the recording film, if employed, and extending normal to the film surface.

In vacuum spectrometers or spectrographs of the above-mentioned type the grating is oriented so that the incident light beam passing through the entrance slit will be oblique to the grating surface.

It should be noted that in devices of this type the ratio of the intensity of the light of a certain wavelength reflected from the grating to the intensity of the incident light is dependent on the angle of incidence of the light impinging on the grating. In other words, the measuring range for short wavelengths is proportional to the degree to which the angle of incidence of radiation striking the concave grating approaches 90°.

On the other hand, for quantitative measurements it is usually desirable to have the angle of incidence as small as possible so as to suppress higher orders of interference. It is therefore always desired, when using a highly blazed grating, to attain an optimum signal-to-noise ratio for each wavelength. Thus, if diffraction spectometers or spectrographs are to be utilizable for a wide range of wavelength, e.g. for a wavelength range between 10 and 600 A., the angle of incidence must be variable. Moreover, it is desirable to have a continuously variable angle of incidence.

Various types of diffraction spectrometers having variable angles of incidence have already been suggested. It is known, for example, to have the grating and the exit slit disposed on arms which pivot around the center of the Rowland circle (see, for example, Applied Optics, vol. 3, No. 1, 1964, p. 116). When varying the angle of incidence, the optical axis of the incident light beam is rotated, this rotation being, however, with reference to a stationary reference system.

This presents certain drawbacks if, for example, the same spatial region of the light source is to be analyzed because in such cases either the light source or the vacuum spectrometer must be displaced with reference to the stationary system. A displacement of the light source, however, is impossible in a number of cases, as for example with Theta pinch machines, extraterrestrial objects, or the like. Correspondingly, displacement of the vacuum spectrometer can generally be carried out only with great effort since the known devices include components, vacuum vessels, pumps and the like which are rigidly connected with the optical parts and which are bulky and quite heavy. A further disadvantage is that a displacement of the vacuum spectrometer can result in a decrease in the alignment accuracy.

For the above reasons it has so far not been possible to accomplish consecutive measurements of the intensity of the light from immovable, inhomogenous light sources, such as Theta pinch machines, extraterrestrial objects, or the like, in the vacuum ultraviolet spectrum, i.e., in the approximate range of 10 A.$\leq \lambda \leq$600 A. if the wavelengths are widely separated.

SUMMARY OF THE INVENTION

It is therefore an object of the present invention to eliminate these drawbacks. Another object of the invention is to provide a vacuum ultraviolet spectrometer for measuring radiation from a stationary source while permitting the angle of incidence to be continuously varied without interrupting the vacuum.

Yet another object of the present invention is to permit the grating and each detector to be positioned independently at any desired location along the Rowland circle.

A further object of the present invention is to provide improved detector elements for such apparatus.

These and other objects according to the present invention are achieved by certain improvements in a vacuum spectrometer for the diffraction and measurement of radiation emanating from a stationary source, particularly radiation in the short wavelength portion of the ultraviolet spectrum, which spectrometer includes, in a vacuum, an entrance slit, a concave reflection grating, at least one detector, the grating and detector being disposed on a Rowland circle, and swivel arms connected to the grating and to each detector for pivoting them about an axis defining the center of the Rowland circle. The improvement according to the present invention essentially includes rotatable support means arranged for rotation, relative to the source, about the longitudinal axis of the slit and parallel to the plane of the Rowland circle, and pivot bearing means carried by the support means, and having a pivot axis which defines the center of the Rowland circle and which is spaced from the axis of rotation of the support means, the bearing means supporting the swivel arms for rotation about the pivot axis in planes parallel to the plane containing the Rowland circle.

DESCRIPTION OF THE PREFERRED EMBODIMENTS

Figure 1:
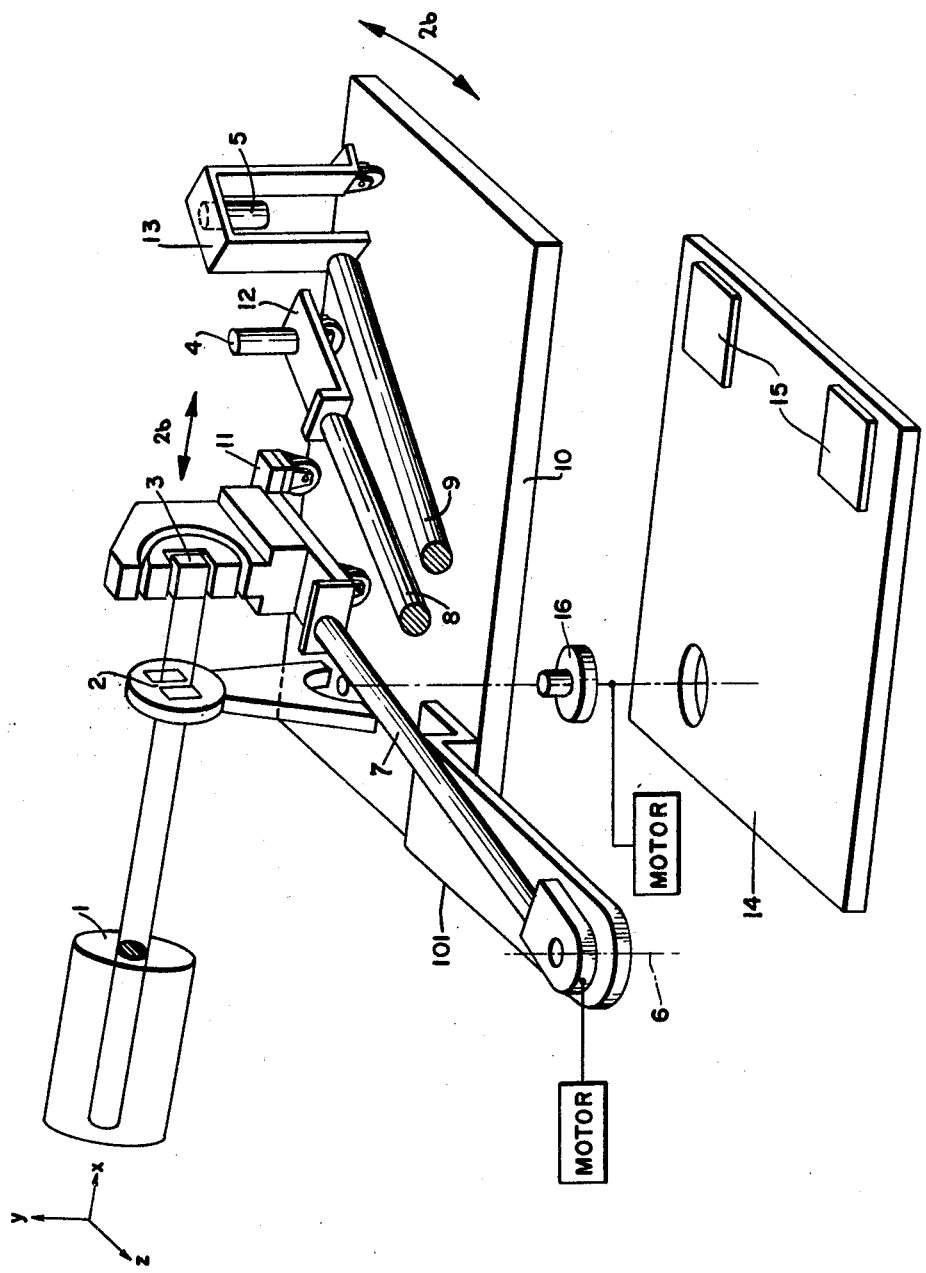
FIGURE 1 is an exploded perspective view of a vacuum spectrometer representing one preferred embodiment of the present invention.

As can be seen in FIGURE 1, light emanates from a light source 1 in the direction of its optical axis—in the reference coordinate system x, y, z shown in FIGURE 1, this is the x-axis—and reaches the entrance slit 2. The light passing through the slit 2 impinges on the grating 3 at an oblique angle of incidence. The slit 2, the grating 3 and the detectors 4 and 5 are disposed, in a known manner, on a Rowland circle whose center is defined by the axis of a bearing 6.

According to the present invention, the slit is supported by means of a suitable mounting on the plate 10. In order to permit the angle of incidence to be varied while the axis of the incident radiation remains stationary, the plate 10, carrying a guide arm 101 supporting bearing 6, is mounted to be pivotal in the direction of the arrows around the axis of a bearing 16 which is coaxial with the longitudinal axis of slit 2.

The longitudinal axis of slit 2 and the axis of pivot bearing 6 are, according to the present invention, spaced from one another by a distance which is equal to the radius of the Rowland circle. Rotation of the plate 10 around its pivot point, the axis of bearing 16, thus serves to displace the center of the Rowland circle along a circular path. Therefore, since the grating 3 and the detectors 4 and 5 are, according to the present invention, pivotally connected to the guide arm 101 by means of the swivel arms 7, 8 and 9, respectively, pivotally connected to bearing 6, rotation of the plate 10 about pivot bearing 16 results in a change of position for the Rowland circle of the entire system with reference to the stationary radiation axis. The arms 8 and 9 are mounted on bearing 6 at points spaced above the mounting location of arm 7.

In order to assure that the grating 3 and the detectors 4 and 5 will be moved along the Rowland circle with the required high precision and in one plane, the grating 3 and the detectors 4 and 5 are disposed on carriages 11, 12 and 13, respectively, which can be rolled on casters over the plate 10. To assure that, for each rotational position, the plate 10 remains in a precisely horizontal plane parallel to the median plane of the grating, the device according to the present invention is provided with a stationary support plate 14 having slide support pieces 15 and carrying the pivot bearing 16 coaxial with the center axis of the slit 2.

According to a highly suitable construction of the vacuum spectrometer of the present invention, the mounting for the grating 3 is constructed in compact form in such a manner that the sides of the grating are unobstructed so that the angle of incidence can be adjusted up to a value of 89° from the normal to the grating surface, this being approximately the position shown in FIGURE 1.

Generally it is sufficient to provide a variation of the angle of incidence between 89° and 80°. In this case the decrease of the slit aperture is in practice negligible.

As can be seen in FIGURE 1, the pivot arms 8 and 9 for the detectors 4 and 5 are movable in respective spaced parallel planes. The carriages 12 and 13 are constructed in such a way that the detectors can be moved past each other and could even be placed at the same position on the Rowland circle so that the same wavelength portion can be simultaneously measured by both detectors.

In FIGURE 1 only a portion of plate 10 is shown. In practice, this plate will have a larger extent to permit a more extended rotation of carriages 11, 12 and 13 along the Rowland circle.

Thus the present invention provides an arrangement which permits the angle of incidence between the light beam passing through slit 2 and the normal to the center of the grating surface can be varied over a wide range by displacing the center of the Rowland circle by the desired amount, while permitting the axis of the incident radiation to remain stationary. A further advantage of the vacuum spectrometer according to the present invention is that the angle of incidence can also be varied very simply while the device is maintained in a vacuum. Because of the simplicity of this arrangement, the angle of incidence can be varied by remote control, which is of particular significance for vacuum spectrometers to be used in spacecraft. It is further advantageous that the angle of incidence can be changed very quickly.

If the holder for the grating according to the present invention is constructed in compact form in a manner known per se, it is possible to adjust the device to achieve an angle of incidence of as much as 89°, this representing a further advantage of the vacuum spectrometer according to the present invention.

A particularly great additional advantage of the novel vacuum spectrometer is that the detectors can be pivoted around the center of the Rowland circle independently of the particular position of the grating so that the intensity at different wavelength ranges can be measured.

It would also be possible, according to the present invention to mount the entrance slit 2 so that it remains stationary during rotation of the support plate 10, the longitudinal axis of the slit still being coaxial with the axis of rotation of the plate. This could be achieved, for example, by making the bearing 16 stationary with respect to support plate 14, so that the rotation of plate 10 is with respect to bearing 16 itself, and by mounting the slit directly on the center post of bearing 16.

It has been found to be very advantageous to have the guide arm which carries the pivot defining the center of the Rowland circle rigidly connected to a plate which supports the slit and on which the grating and the detector or detectors can be rolled, in a known manner, by means of casters. This permits the swivel action of the slit, the grating and the detectors to occur in one plane and to have the high precision required for such measurements. These results are achieved in a particularly satisfactory manner in the device illustrated in FIGURE 1 wherein the bearing 16 disposed coaxially with the center axis of the slit for the rotation of the plate, to which the slit is fastened by means of a known mounting, is disposed on a base plate provided with slide pieces, known per se, to guide the movable plate.

According to a further advantageous feature of the present invention the swivel arms for the detectors are spaced from one another along the axis of pivot 6 and the detectors are attached by means of suitably shaped mounting pieces to the free ends of the swivel arms so that the radiation emanating from the light source impinge on the detectors in equal proportions.

The principal advantages of the form of construction of the novel vacuum spectrometer according to the present invention consist in the following:

It is often necessary to measure radiation which alternates with time between two different wavelength regions and to compare the radiation intensities in the two regions. In this case the spectrometer is used as a time-resolving polychromatic detector. It is now possible, with the vacuum spectrometer according to the present invention, to dispose two detectors in two planes parallel to the meridional plane of the grating and immediately adjacent to each other and to position the detectors on the Rowland circle independently of each other and independently of the position of the grating, i.e., the detectors can be placed at any two arbitrary, adjacent positions.

Thus it is possible with the aid of the novel vacuum spectrometer, when using two time-resolving detectors, to record the dependence of intensity on time in two arbitrary, adjacent wavelength ranges which are determined by the width of their exit slit. This implies that both detectors could also record simultaneously the chronological alternations of the same wavelength range. This presents the further possibility of employing the detectors to determine if the optical axis of the incident radiation lies in the median plane of the grating, which plane contains the Rowland circle, a prerequisite which must be met, as is well known, for quantitative analyses. It is also possible, as is self-evident, to compare the relative sensitivity of the two detector systems as well as their time constants, thus increasing the reliability of the indication for absolute intensity determinations.

In a very suitable practical embodiment of the present invention, the guide arm 101 which is pivotal around a point on the center axis of the slit, or the plate together with the guide arm for the slit, as well as the swivel arm for the grating, are each driven in a manner known per se by a servomotor, as shown in FIGURE 1, and the motors can be coupled to each other. Alternatively, for the purpose of employing the motor torque to rotate the pivot arms, gear drives can be provided in a known manner.

According to a preferred embodiment of the vacuum spectrometer according to the present invention, the detectors can each consist of a planar scintillating body connected to a photomultiplier by means of a known photoconductor. According to the present invention, the scintillator can have four adjacent mirrored surfaces and one of the remaining two narrow surfaces can constitute the exit slit of the spectrometer arrangement while the other remaining surface is connected in a known manner to the photoconductor. This embodiment of the novel vacuum spectrometer according to the present invention is particularly advantageous because it makes possible the displacement of both detectors in two immediately adjacent planes.

Figure 2:
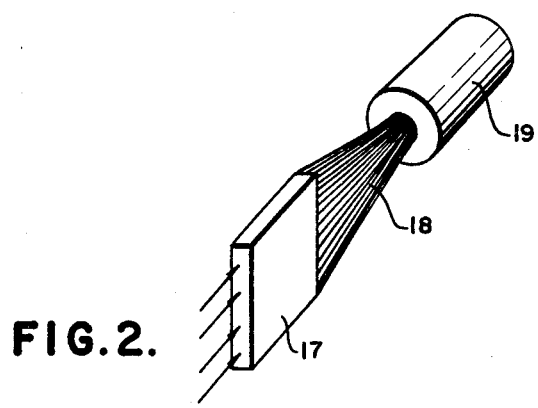
FIGURE 2 is a perspective detail view of one type detector to be used in the vacuum spectrometer of FIGURE 1.

FIGURE 2 shows such a detector consisting of a scintillator 17, all of whose surfaces are mirrored except for those surfaces provided for the entry and exit of the light. The unmirrored surfaces are constructed, as shown in FIGURE 2, so that the surface facing the incident light beam, indicated by the arrows, serves as an exit slit for the spectrometer arrangement. The scintillator could be manufactured of a known mixture of polyvinyl toluol, p-terphenyl and diphenyl stilbene. It is, of course, also possible to use any other suitable material. A photoconductor 18 consisting, for example, of fiberglass threads is connected in a known manner to transmit the output of scintillator 17 to the input of a photomultiplier 19.

In order to provide an easy interchange of detectors presenting differing exit slit widths and at the same time to guarantee as much accuracy as possible in the alignment of the detectors, the present invention provides a mounting for the plate-shaped scintillator which consists of a cylindrical body detachably mounted in a support body having a recess which generally defines an isosceles triangular prism whose angle bisector intersects the center of the Rowland circle and against whose sides the cylindrical body bears. According to the present invention, this cylindrical body has two vertical, polished surfaces at right angles to each other, one of which surfaces lies in a vertical plane containing a radius of the Rowland circle.

Figure 3:
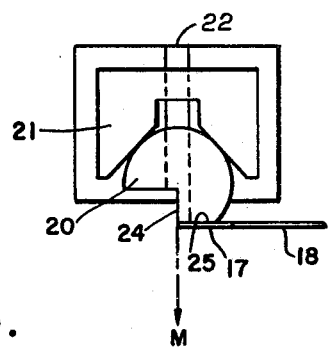
FIGURE 3 is a plan view showing a mounting for the detector of FIGURE 2.
Figure 4:
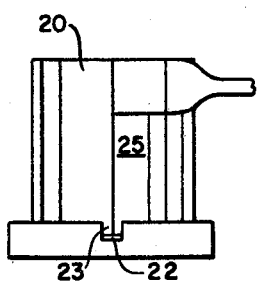
FIGURE 4 is an elevational view of the mounting of FIGURE 3.

Such a mounting for the detector according to FIGURE 2 consists, as shown in FIGURES 3 and 4, of a cylinder 20 which is detachably connected to a support body 21. The support body is here disposed either on one of the two swivel arms 8 or 9 or on one of the two carriages 12 or 13 in such a manner that the angle bisector M of the recess in the support body, the recess having the form of an isosceles triangular prism, passes through the center of the Rowland circle. The cylinder is cut away to present two plane, vertical polished surfaces 24 and 25 which are perpendicular to one another and which serve to align the detector and to facilitate the mounting of the cylinder.

One of the two polished surfaces 24 of the cylinder 20 lies in a vertical plane which contains center axis M. This surface serves to align the narrow detector surface which constitutes the exit slit of the spectrometer and which faces the light entry point. The other polished surface 25 serves to hold the detector by means of a clamping device (not shown in the drawing). This latter polished surface is here located, according to the present invention and taking into consideration the thickness of the scintillator 17 employed, so that the Rowland circle will intersect the long axis of the scintillator surface constituting the spectrometer light exit slit and facing the light entry point. The cylinder 20 is secured in a known manner against rotation about its vertical axis by a slot 22 and a key 23. To connect the cylinder 20 with the body 21, a known detachable connection, e.g., a screw connection is provided.

When two arrangements of the type shown in FIGURES 3 and 4 are employed in the apparatus of FIGURE 1, one detector 17 will be positioned flush with the top of its cylinder 20, while the other mounting arrangement will be inverted so that its detector will be flush with the bottom of its associated cylinder. The detectors could be replaced by film sheets if the device is to be used as a spectrograph.

It will be understood that the above description of the present invention is susceptible to various modifications, changes, and adaptations.

We claim:

1. In a vacuum spectrometer for the diffraction and measurement of radiation emanating from a stationary source, particularly radiation in the short wavelength portion of the ultraviolet spectrum, which spectrometer includes, in a vacuum, an entrance slit, a concave reflection grating, at least one detector, the grating and detector being disposed on a Rowland circle, and swivel arms connected to the grating and to each detector for pivoting them about an axis defining the center of the Rowland circle, the improvement comprising:

rotatable support means arranged for rotation, relative to the source, about the longitudinal axis of said slit and parallel to the plane of the Rowland circle; and pivot bearing means carried by said support means, and having a pivot axis which defines the center of the Rowland circle and which is spaced from the axis of rotation of said support means, said bearing means supporting said swivel arms for rotation about the pivot axis in planes parallel to the plane containing the Rowland circle.

2. An arrangement as defined in claim 1 wherein said support means include a plate on which said entrance slit is supported, said arrangement further comprising a plurality of carriages, one supporting said grating and one supporting each said detector, arranged to roll along the surface of said plate.

3. An arrangement as defined in claim 2 further comprising a stationary support plate, slide support pieces mounted on said support plate for supporting said plate of said support means, and pivot-bearing means mounted on said stationary plate and connected to said plate of said support means for defining the axis of rotation of said support means.

4. An arrangement as defined in claim 1 wherein said swivel arms are connected to said pivot-bearing means at respective points spaced along the pivot axis of said bearing means and wherein there are at least two detectors, said arrangement further comprising a plurality of carriages, one supporting each said detector, said carriages being constructed for permitting said detectors to move past one another along the Rowland circle, and said detectors being positioned so that when they are at the same position on the Rowland circle each detector receives an equal portion of the radiation coming from said grating.

5. An arrangement as defined in claim 1 wherein said rotatable support means and said swivel arms are arranged to be rotated by at least one electric motor.

6. An arrangement as defined in claim 1 wherein said detector comprises: a planar scintillator having four lateral mirrored surfaces, a front edge surface constituting a light exit slit, of said spectrometer and a rear edge surface at which the light output from said scintillator appears; photoconductor means connected to the rear edge surface of said scintillator; and photomultiplier means having its input connected to said photoconductor means.

7. An arrangement as defined in claim 6 further comprising a mounting for said scintillator, said mounting including a generally cylindrical body whose axis is arranged perpendicular to the plane of the Rowland circle, a support body having a recess in the form of an isosceles triangular prism, in which recess said cylindrical body is detachably mounted, said support body being arranged so that the angle bisector of its recess passes through the center of the Rowland circle, said cylindrical body being provided with two polished surfaces disposed at right angles to one another and perpendicular to the plane of the Rowland circle, one of said surfaces lying in a plane containing a radius of the Rowland circle and being provided for aligning the front edge surface of said scintillator.

References Cited
UNITED STATES PATENTS 3,211,049 10/1965 McPherson _____ 250—51.5 X
3,229,568 1/1966 Webb _____ 356—51 X RALPH G. NILSON, Primary Examiner A. L. BIRCH, Assistant Examiner U.S. Cl. X.R.

250—51.5; 356—74, 79